UNITED STATES PATENT OFFICE.

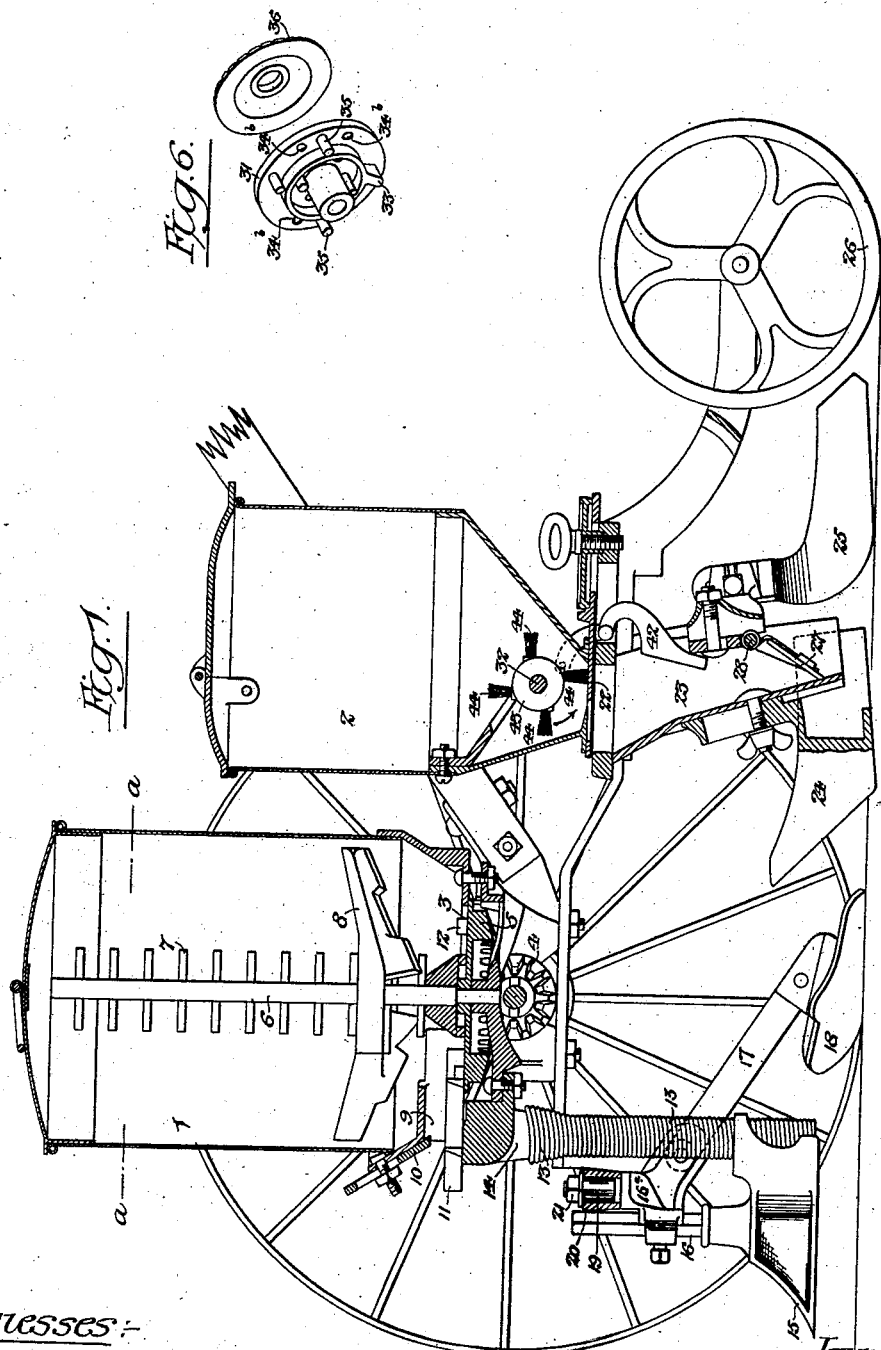

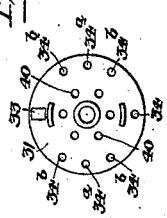

FRANK BATEMAN, OF GRENLOCH, NEW JERSEY, ASSIGNOR TO THE BATEMAN MANUFACTURING COMPANY, OF GRENLOCH, NEW JERSEY, A CORPORATION OF NEW JERSEY.

COMBINED SEED-DRILL AND FERTILIZER-DISTRIBUTER.

SPECIFICATION forming part of Letters Patent No. 715,633, dated December 9, 1902.

Application filed December 14, 1900. Serial No. 39,865. (No model.)

*To all whom it may concern:*

Be it known that I, FRANK BATEMAN, a citizen of the United States, residing in Grenloch, New Jersey, have invented certain Improvements in a Combined Seed-Drill and Fertilizer-Distributer, of which the following is a specification.

The objects of my invention are to readily govern the distances apart at which the seed shall be distributed in the furrow and to prevent crushing of the seed by the brush-like stirrer or agitator employed at the base of the seed-hopper. These objects I attain in the manner hereinafter set forth, reference being had to the accompanying drawings, in which—

Figure 1 is a longitudinal sectional view of a combined fertilizer-distributer and seed-drill constructed in accordance with my invention. Fig. 2 is a sectional plan view of part of the same on the line $aa$, Fig. 1. Figs. 3 and 4 are face views of the dropper-regulator with the cap-plate removed. Fig. 3ª is a side or face view of the tappet wheel or disk. Fig. 5 is a transverse section of said dropper-regulator, and Fig. 6 is a perspective view of the dropper-regulator with the cap-plate removed.

The frame of the machine may be similar to any of those now employed and may have any ordinary form of fertilizer-hopper 1 and seed-hopper 2 mounted thereon. In the present instance the fertilizer-hopper has a rotatable bottom plate 3, driven by bevel-gears 4 and 5 from the main axle of the machine and having a vertical shaft 6, with projecting stirrers 7 and gravity-scraper 8, which rests upon the top of the mass of fertilizer in the hopper, rotates with the shaft 6, and gradually descends as the supply of fertilizer is withdrawn.

The fertilizer is discharged through a throat 9, the area of the delivery-mouth of said throat being regulated by an adjustable valve-plate 10, and mounted upon a suitable stud on the fixed frame, so as to project into the throat 9, is a winged horizontal scraper 11, so disposed in respect to certain projecting pins 12 on the rotating bottom plate of the fertilizer-distributer that said pins will as said bottom plate rotates come into contact with the successive arms or blades of the scraper 11, and thereby impart intermittent movements of partial rotation thereto, so that there will be a positive scraping or carrying forward of successive masses of fertilizer through the throat 9, thus preventing any clogging of the same or any failure to deliver the proper amount of fertilizer to the conveyer-tubes 13, which are of the usual flexible character and are connected at their upper ends to suitable nozzles 14 on the fixed frame and at their lower ends to rearwardly-projecting brackets on the furrowing-blades 15, of which in the present instance there are two, each having a stem 16, vertically adjustable in a bracket 16ª, to which is hung the upper end of an arm 17, the latter carrying at its lower end a covering-blade 18. The bracket 16ª has a vertical stem 19, which passes through a slot in a transverse bar 20 on the fixed frame and has a nut 21 bearing upon the top of said bar, so that the brackets, with their arms 17 and furrowing-blades 15 and covers 18, can either be moved closely together, so as to bring the furrowing-blades side by side at the center of the machine in order to form a single furrow for receiving the fertilizer, or can be separated laterally, as shown in Fig. 2, so that each blade will form its own independent fertilizer-receiving furrow, as in applying fertilizer to the opposite sides of a row of growing plants, or, if preferred, one of the furrowing-blades can be removed entirely and but one made use of, with both conveyer-tubes 13 attached to it, said furrowing-blade being then placed in the center of the transverse bar 20.

The seed-hopper 2 has at the bottom the usual adjustable delivery-regulating plate 22, and below the seed-hopper is a delivery-spout 23, which carries the usual furrowing-blade 24, the latter operating in conjunction with side coverers 25 and presser-wheel 26 in the usual manner. The spout has in its lower portion the usual dropper-valve 27, which is normally closed, so as to retain the seed flowing into the spout, but is opened at intervals, so as to drop the accumulated seed, the frequency of this opening movement determining the distances apart at which the seeds are planted. The dropper-valve is carried by the shaft 28, mounted in the spout, and this shaft has an arm 29, which is acted upon by one arm of a lever 30, hung to a suitable stud on the fixed frame of the machine, the other arm of said lever being acted upon by projections on a tappet-wheel 31, which is secured to a shaft 32, extending transversely through the bottom of the seed-hopper, this shaft receiving rotating movement from the axle of the machine by any available system of gearing.

The tappet-wheel 31 has adjacent to its periphery a tappet 33 and a series of openings 34, 34ª, and 34ᵇ, so spaced with respect to each other and to the tappet 33 as to provide for considerable variety in the operation of the seed-dropper. Thus in the present instance there is the opening 34 at one hundred and eighty degrees from the tappet, two openings 34ª at ninety degrees from the tappet and the opening 34, and four openings 34ᵇ at sixty degrees from the tappet and the opening 34.

Through any one of the openings 34, 34ª, or 34ᵇ may be passed the stem of a pin or rivet 35, having an enlarged head bearing upon the outer face of the tappet-disk 31, these pins being held in position by means of a cap-plate 36, fitting over the end of the shaft 32 and confined in position by a suitable thumb-nut 37, as shown in Fig. 5. By the use of seven of these openings and five pins, therefore, the tappet-disk 31 may be provided with a single tappet or with two, three, four, or six equidistantly-spaced tappets. Thus with the use of a single tappet-wheel I provide for a wide range in the spacing of the seed and dispense with the series of independent cams usually employed for this purpose.

The tappet-disk 31 has an inner or secondary series of openings 40 for receiving the pins not in use in the outer series of openings, these reserve pins being also held in place by the cap-plate 36.

The arm 29 on the shaft of the dropper-valve 27 has at its outer end a pocket 41, and when it is desired to throw the dropper out of action movement in excess of that imparted to it by the tappet-disk 31 is imparted to the lever 30 by hand, so as to cause the lower end of said lever to enter the pocket 41, thereby locking the arm 29 and lever 30 together until they are released by hand.

The spout 23 has the usual supplementary cut-off 42, whereby it may be closed, so as to prevent the feeding of seed through the same when the machine is being turned at the end of a row.

The shaft 32 at the bottom of the feed-hopper carries a drum 43, with projecting tufts or bunches 44 of bristles or other brush material; but these tufts are disposed tangentially to the shaft instead of radially, as usual, so that as the drum 43 rotates in the direction of the arrow, Fig. 1, they will act with a sweeping action upon the seed and will not be so likely to crush or bruise the seed by jamming them between the ends of the tufts and the casing of the hopper, as they would if disposed radially in the ordinary way.

Having thus described my invention, I claim and desire to secure by Letters Patent—

1. The combination of the dropper-valve of a seed-delivery spout, with operating mechanism therefor, the same including among its elements a lever, a tappet-disk having in it outer and inner sets of spaced openings, pins constructed to fit said sets of openings and placed to engage the lever when the device is operated, with a cap-plate having openings corresponding to those in the tappet-disk and means for removably holding said cap-plate in position, substantially as described.

2. The combination of the dropper-valve of the seed-delivery spout, with operating mechanism therefor having as one of its elements a tappet-disk with spaced openings therein, detachable pins adapted to said openings, and a removable cap-plate for retaining said pins in place, substantially as specified.

3. The combination of the dropper-valve of the seed-delivery spout, with operating mechanism therefor comprising an arm on the valve-shaft, said arm having a pocket at the outer end, a lever for operating said arm, and a tappet-disk for acting on the lever, substantially as specified.

4. In a seed-distributing device, the combination of a hopper, a shaft passing therethrough, means for permitting the discharge of material from the hopper and a brush on said shaft, said brush having tufts extending in lines other than radial to the axis of the shaft whereby the discharge of material is facilitated when the shaft is rotated.

5. In a device of the character described, the combination of a seed-delivery spout, with a dropper-valve, operating mechanism for said valve including a valved shaft having an arm, a lever placed to engage said arm and means for periodically moving said lever, said arm and the lever having means whereby they may be locked together at will beyond the range of action of said actuating means, substantially as described.

In testimony whereof I have signed my name to this specification in the presence of two subscribing witnesses.

FRANK BATEMAN.

Witnesses:
FRANK E. BECHTOLD,
JOS. H. KLEIN.